Oct. 23, 1962  L. T. HOPPE ETAL  3,059,964
STOWABLE JUMP SEAT
Filed Aug. 26, 1960  3 Sheets-Sheet 1

LEWIS T. HOPPE
JOSEPH V. MAKOWSKI
INVENTORS

BY John R. Faulkner
John J. Roethel
ATTORNEYS

Oct. 23, 1962 L. T. HOPPE ETAL 3,059,964
STOWABLE JUMP SEAT
Filed Aug. 26, 1960 3 Sheets-Sheet 2

LEWIS T. HOPPE
JOSEPH V. MAKOWSKI
INVENTORS

BY John R. Faulkner
John J. Roethel

ATTORNEYS

Oct. 23, 1962 L. T. HOPPE ETAL 3,059,964
STOWABLE JUMP SEAT

Filed Aug. 26, 1960 3 Sheets-Sheet 3

LEWIS T. HOPPE
JOSEPH V. MAKOWSKI
INVENTORS

BY John R. Faulkner
John J. Roethel

ATTORNEYS

United States Patent Office 3,059,964
Patented Oct. 23, 1962

3,059,964
STOWABLE JUMP SEAT
Lewis T. Hoppe, Dearborn, and Joseph V. Makowski, Farmington, Mich., assignors to Ford Motor Company, Dearborn, Mich., a corporation of Delaware
Filed Aug. 26, 1960, Ser. No. 52,200
4 Claims. (Cl. 297—13)

This invention concerns motor vehicles and more particularly a foldable seat structure to be used in such vehicles.

Often it is desired to carry more passengers in a motor vehicle than there are permanent seats to accommodate them. This is particularly true with respect to vehicles which are intended to serve a variety of functions, such as delivery vans, buses or station wagons. Such vehicles are often provided with an auxiliary seat to accommodate the occasional extra passengers. These seats, which are commonly called "jump seats," must be of sufficient size and construction to be comfortable for the passenger, yet, must also be foldable into a compact area to allow maximum storage and access areas when not in use.

Most conventional seats of the foldable type generally comprise a hinged structure in which the seat back is folded down against the seat cushion. This structure is then folded against some other part of the vehicle's body, or in many cases against another seat. The hinge or hinges which allow the seat structure to be folded out of the way when not in use normally provide the sole support for the seat when open and carrying an occupant. Often these hinges are of insufficient strength to support the additional load of the passenger and damage results to the hinge necessitating repair or replacement.

An object of the present invention is to provide a seat that is comfortable and yet conveniently folds into a minimum of space when not in use to provide maximum storage area.

A further object is to provide additional support for the seat when it is open to carry the weight of the seat and its occupant.

These results are accomplished by providing a seat in which the back remains substantially vertical both when in use and when stored. A seat cushion support hinge is provided which allows the cushion to be rotated into a substantially vertical position against the seat back where it is locked for storage when not in use. The seat back is supported at one corner by means of a bracket that allows the entire seat assembly to be swung about an upstanding axis. In this way the folded seat, when not in use, may be swung out of the way to provide a maximum of storage area. In this invention the seat is stored against the vehicle wall. Means independent of the seat back and its mounting bracket are provided to support the cushion when in use. The provision of this additional support for the seat cushion allows the use of less complex support bracket and hinges. In this way, the entire load of the seat and its occupant need not be borne entirely by the support bracket mounting the seat for swinging movement. In a preferred embodiment of the invention, a latch is provided between the seat cushion and the additional support means for locking the seat cushion in its horizontal position when in use.

Other features and advantages of this invention will be made more apparent as this description proceeds, particularly in connection with the accompanying drawings in which.

Figure 1:
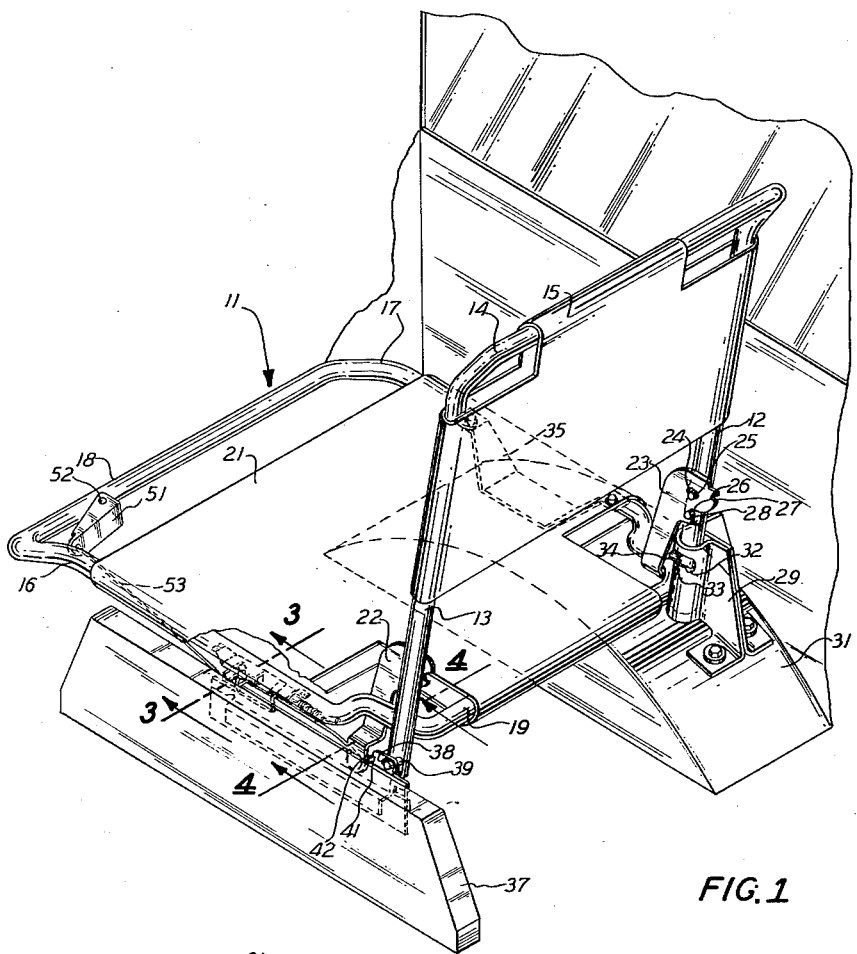
FIGURE 1 is a perspective view of a portion of a motor vehicle incorporating this invention having a portion of the seat broken away to more clearly show the detail of construction.
Figures 3, 4:
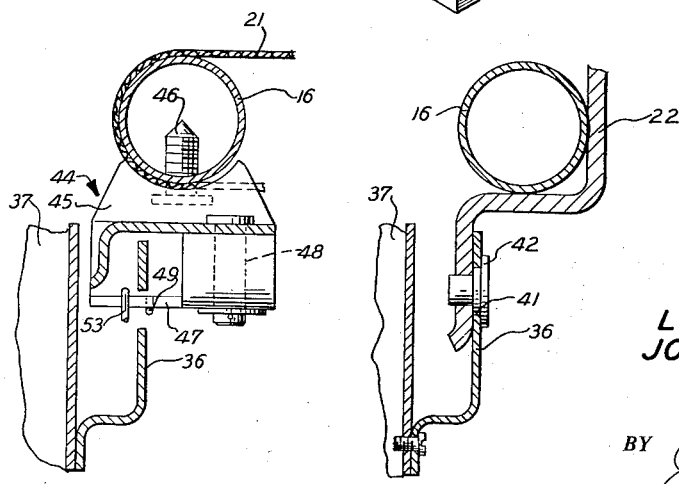
FIGURE 3 is a section taken along line 3—3 of FIGURE 1.
FIGURE 4 is a section taken along line 4—4 of FIGURE 1.
Figure 2:
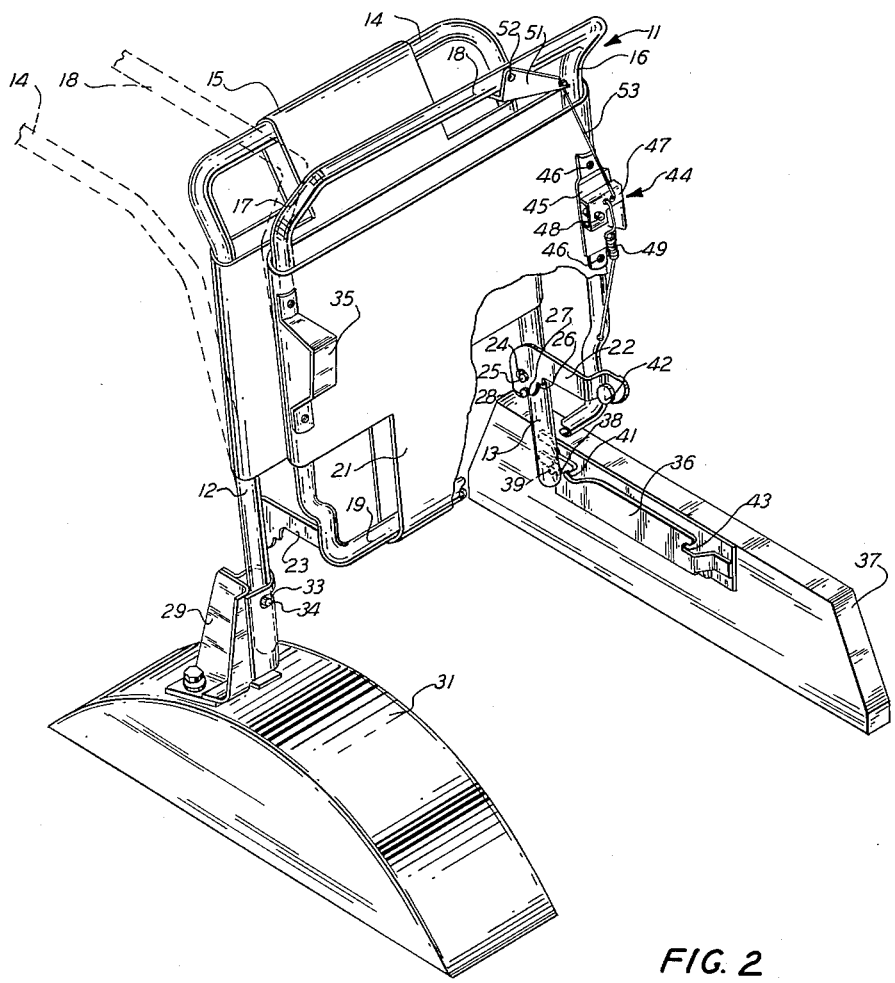
FIGURE 2 is a perspective view of the seat of FIGURE 1 from another angle showing the seat in its folded position in solid outline and showing in phantom the seat in its stored position.

Referring now to the embodiment of the invention illustrated in FIGURES 1–4, there is shown in FIGURE 1 a seat structure, generally designated 11, having a seat back and a seat cushion. The seat back consists of a frame comprising sides 12 and 13, and top 14 formed of a one piece tubular construction, as shown, or constructed in any other suitable fashion. The back frame is covered with a fabric covering 15 or may be otherwise suitably upholstered. The seat cushion comprises a frame formed of sides 16 and 17, front 18 and back 19 and is also of a one piece tubular construction, although other constructions may be used if so desired. The cushion frame is also covered by fabric covering 21 or upholstered in any desired manner.

The seat cushion is supported from the back frame by means of arms 22 and 23 that are welded or otherwise fastened to the cushion frame sides.

Arms 22 and 23 are formed with slots 24 which accommodate pins 25 formed on seat back sides 12 and 13. The cushion is thus supported by these pins for swinging about an axis substantially parallel to the vehicle floor from the open position shown in FIGURE 1 to the folded position shown in FIGURE 2. Arms 22 and 23 are formed with notches 26 and 27 which coact with pins 28 formed on seat back sides 12 and 13. As is shown in FIGURE 1, notches 26 coact with pins 28 to hold the seat cushion in its open position. As may be seen in FIGURE 2, notches 27 coact with pins 28 to lock the seat cushion in the folded position.

The entire seat structure thus far described is supported by a bracket 29 suitably bolted or welded to the vehicle floor 31. Bracket 29 supports the side 12 of the seat back frame in such a manner that the entire seat assembly may be pivoted about bracket 29 from the position it occupies when in use, shown in FIGURE 1, to the position shown in phantom in FIGURE 2. This later position is the position the seat occupies when stored against the vehicle wall. To assist in maintaining the seat in its stored position, a notch 32 is formed in slot 33 of bracket 29. Pin 34 on the side 12 of the seat back frame falls into this notch when the seat is pivoted into its storage position, thus locking the seat in this position.

Additional means are provided for supporting the seat and its occupant when the seat is in its open position. A leg 35 is secured to the seat cushion by screws or other suitable fastening means. This leg bears against the vehicle floor 31 to provide additional support for this side of the seat when the seat is in its open position. The other side of the seat is supported by the bracket 36, best shown in FIGURE 2, which is suitably secured to projection 37 of the vehicle floor. Bracket 36 is formed with a notch 38 which receives pin 39 formed on the side 13 of the seat back frame. Notch 41 of the bracket 36 receives projection 42 carried by the extension of arm 22. This engagement is clearly shown in FIGURE 4.

Bracket 36 further includes a notch 43 which coacts with a latch mechanism generally shown at 44 on the bottom of the seat cushion to form a latch assembly to lock the seat in its open position. The latch mechanism 44 includes a bracket 45 secured, as by screws 46, to side 16 of the seat back frame, see FIGURES 1 and 3. Bracket 45 mounts a latch device 47 for pivotal movement about pin 48 suitably secured to bracket 45. The edge of the latch device 47 coacts with the notch 43 in bracket 36 to lock the seat cushion in its open position. A tension spring 49 is secured at one end to the latch device and at its other end to the side 16 of the seat back frame to yieldably urge the latch device toward its locked position. To release the latch device a handle 51 is provided which is pivoted about pin 52 secured to the front 18 of the seat cushion frame. A cable or other suitable member 53 extends between the handle 51 and latch device 47.

*Operation*

The seat shown in FIGURES 1–4 may be folded and stored in the following manner: With the seat in its open position shown in FIGURE 1, handle 51 is grasped causing it to pivot about pin 52 in a clockwise movement as viewed in FIGURE 1. This motion is transmitted by cable 53 to latch device 47 by cable 53 causing the latter to pivot about pin 48. This in turn frees its edge from notch 43 and the seat may now be folded. This is accomplished by pulling the seat cushion forward and lifting it at its front end. Pins 28 are thereby freed from notches 26 and the seat cushion may be rotated about pins 25 into the position shown in FIGURE 2. The cushion will be held in this position by the interaction pins 28 and notches 27. The seat is then rotated about bracket 29 so that pin 39 is freed from notch 38 in bracket 36. When the seat is rotated against the vehicle wall into the position shown in phantom in FIGURE 2, pin 34 on the side 13 of the seat back frame coacts with the notch 32 in groove 33 to maintain the seat in its stored position. If it is desired to put the seat into use from its stored position, the above procedure is reversed.

Figure 7:
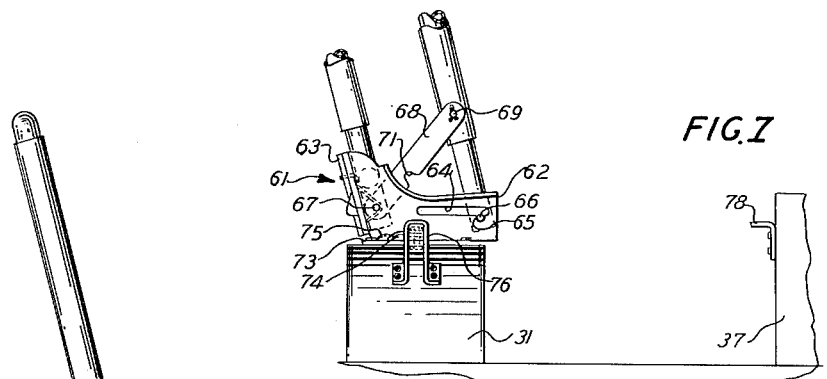
FIGURE 7 is a front elevation of the embodiment of FIGURE 5 showing the seat in its stored position.
Figure 5:
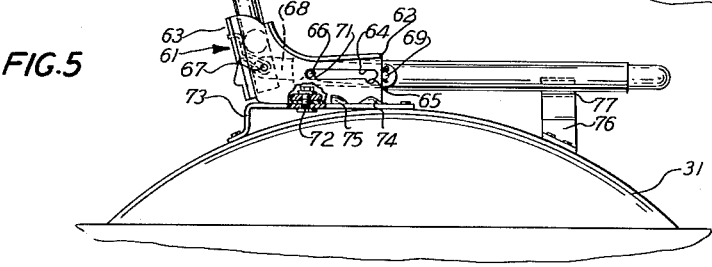
FIGURE 5 is a side elevation of a second embodiment of this invention with a portion broken away to more clearly show the support structure.
Figure 6:
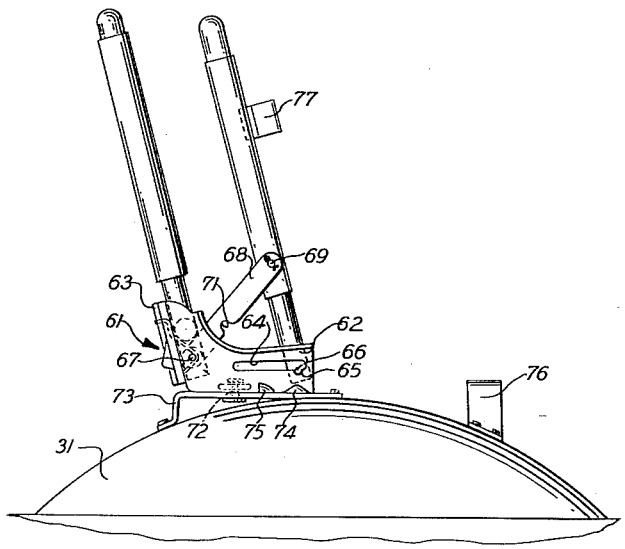
FIGURE 6 is a side elevation of the embodiment of FIGURE 5 showing the seat in its folded position.

Referring now to the embodiment shown in FIGURES 5–7, the frame of the cushion and back of the seat are similar in construction to the construction shown in FIGURES 1–4 and reference may be had to the description of that construction for their details. The mechanism which allows the seat of this modification to be folded consists of two bracket assemblies indicated generally at 61, one of which is located at each side of the seat. Since each of these assemblies are similar, only one will be described in detail. Each bracket assembly consists of a side plate 62 and a back 63 which are preferably of one piece construction. The side plate 62 has a slot 64 formed therein which also includes notch 65. A pin 66 suitably secured to the seat cushion frame coacts with this slot. A second pin 67 passes through the plate side or of the bracket assembly 61. This pin also passes through the side of the seat back frame and is held in place by any suitable means. A link 68 is pivoted about pin 67 and is pivotally connected at its other end to the seat cushion frame by pin 69. Link 68 is further formed with a notch 71 which coacts with pin 66 of the cushion frame when the latter is in its open position, as shown in FIGURE 5, to lock it in that position.

One of the bracket assemblies 61 is formed with additional structure which allows the folded seat to be swung into a stored position. This is accomplished by forming the lower face of the bracket with a hole to accommodate a pin on bolt 72 which also extends through a hole formed in mounting bracket 73 which is secured to the vehicle floor 31. This structure allows the seat assembly to be swung about pin 72 and to be stored when not in use. Bracket 73 is also formed with stops 74 and 75 which coact with bracket side plate 62 to limit the rotation of the seat. Stop 74 serves to limit rotation of the seat to its open position by abutting bracket side plate 62 as shown in FIGURES 5 and 6. Side plate 62 is brought into an abutment with stop 75 to limit rotation of the seat into its stored position (shown in FIGURE 7).

In addition to bracket 73, additional means are provided for supporting the seat and its occupant when the seat is in its open position. A support bracket 76 is secured to the vehicle floor 31 which coacts with the extension 77 secured to the seat cushion frame. A similar extension is formed on the other side of the seat which extension coacts with bracket 78 secured to the projection 37 of the vehicle floor. A bracket (not shown) similar to bracket 78 is secured to the projection 37 and supports the bracket assembly 61 at the other side of the seat when the seat is in use.

To store the seat structure of the present embodiment from its open position, as shown in FIGURE 5, the front end of the seat cushion is first raised. This frees pins 66 from the action of notches 71 in links 68, and allows the pins to slide forward in the grooves 64 until they engage notches 65. During this movement, the pivotal action of links 68 about pins 67 causes the seat cushion to swing into the folded position shown in FIGURE 6. The folded seat may then be swung about pin 72 into the storage position shown in FIGURE 7.

It will be understood that the invention is not to be limited to the exact construction shown and described, but that various changes and modifications may be made without departing from the spirit and scope of the invention, as defined in the appended claims.

We claim:

1. In a motor vehicle having a floor, a bracket operably connected to said floor, a seat assembly comprising a back portion and a seat portion, said back portion having a section thereof extending into said bracket and supported by said bracket for swinging movement of said back portion about an upstanding axis from a seat assembly operative to a storage position, means on said back portion supporting said seat portion for swinging movement into a folded position adjacent said back portion, means effective to maintain said seat portion in its folded position, further bracket means operatively connected to said vehicle floor, and releasable latch means carried by said seat portion engageable with said further bracket means to lock said seat portion to said further bracket means and thereby maintain said seat assembly in its operative position.

2. In a motor vehicle having a floor, a bracket operably connected to said floor, a seat assembly comprising a back portion and a seat portion, said back portion including an inverted U-shaped frame element having depending legs, one of said legs being received in said bracket and being pivotally supported by said bracket for swinging movement of said back portion about an upstanding axis from a seat assembly operative to a storage position, means on said back portion supporting said seat portion for swinging movement from an unfolded position into a folded position adjacent said back portion, means effective to maintain said seat portion in its folded position, further bracket means operably connected to said vehicle floor, and releasable latch means carried by said seat portion engageable with said further bracket means to lock said seat portion to said bracket and thereby maintain said seat assembly in its operative position.

3. In a motor vehicle having a floor, a bracket operably connected to said floor, a seat assembly comprising a back portion and a seat portion, said back portion having a portion thereof extending into said bracket and supported by said bracket for swinging movement of said back portion about an upstanding axis from a seat assembly operative to a storage position, means on said back portion supporting said seat portion for swinging movement from an unfolded position into a substantially vertical folded position adjacent said back portion, means to maintain said back portion in its folded position, further bracket means operatively connected to said vehicle floor, releasable latch means carried by said seat portion engageable with said further bracket means to lock said seat portion in its unfolded position and thereby maintain said seat assembly in its operative position, and means on said back portion coacting with means on said back portion support bracket limiting the swinging movement of said back seat assembly into its operative and storage positions.

4. In a motor vehicle having a floor, a bracket secured to said floor, a seat assembly comprising a back portion and a seat portion, said back portion including an inverted U-shaped frame element having depending legs, one of said legs being received in said bracket and supported by said bracket for swinging movement of said back portion about an upstanding axis from a seat assembly operative to a storage position, means on said back portion supporting said seat portion for swinging movement from an unfolded position into a substantially vertical folded position adjacent said back portion, means to maintain said back portion in its folded position, further bracket means operatively connected to said vehicle floor, releasable latch means carried by said seat portion engageable with said further bracket means to lock said seat portion in its unfolded position and thereby maintain said seat assembly in its operative position, and means on said back portion coacting with means on said back portion support bracket limiting the swinging movement of said seat assembly into its operative and storage positions.

References Cited in the file of this patent
UNITED STATES PATENTS

| | | |
|---|---|---|
| 1,135,647 | Adler | Apr. 13, 1915 |
| 1,177,951 | Hupp | Apr. 4, 1916 |
| 1,207,599 | Morgan | Dec. 5, 1916 |
| 1,262,374 | Moore | Apr. 9, 1918 |
| 1,345,105 | Quinlan | June 29, 1920 |
| 2,235,751 | Sears | Mar. 18, 1941 |
| 2,495,520 | Grimm | Jan. 24, 1950 |
| 2,565,408 | Teders | Aug. 21, 1951 |

FOREIGN PATENTS

| | | |
|---|---|---|
| 370,418 | France | Dec. 20, 1906 |
| 43,683 | France (Additional) | May 7, 1934 |
| 583,401 | Great Britain | Dec. 17, 1946 |